June 26, 1945.  H. A. GOLLMAR  2,379,076
GAS PURIFICATION PROCESS
Filed July 18, 1944
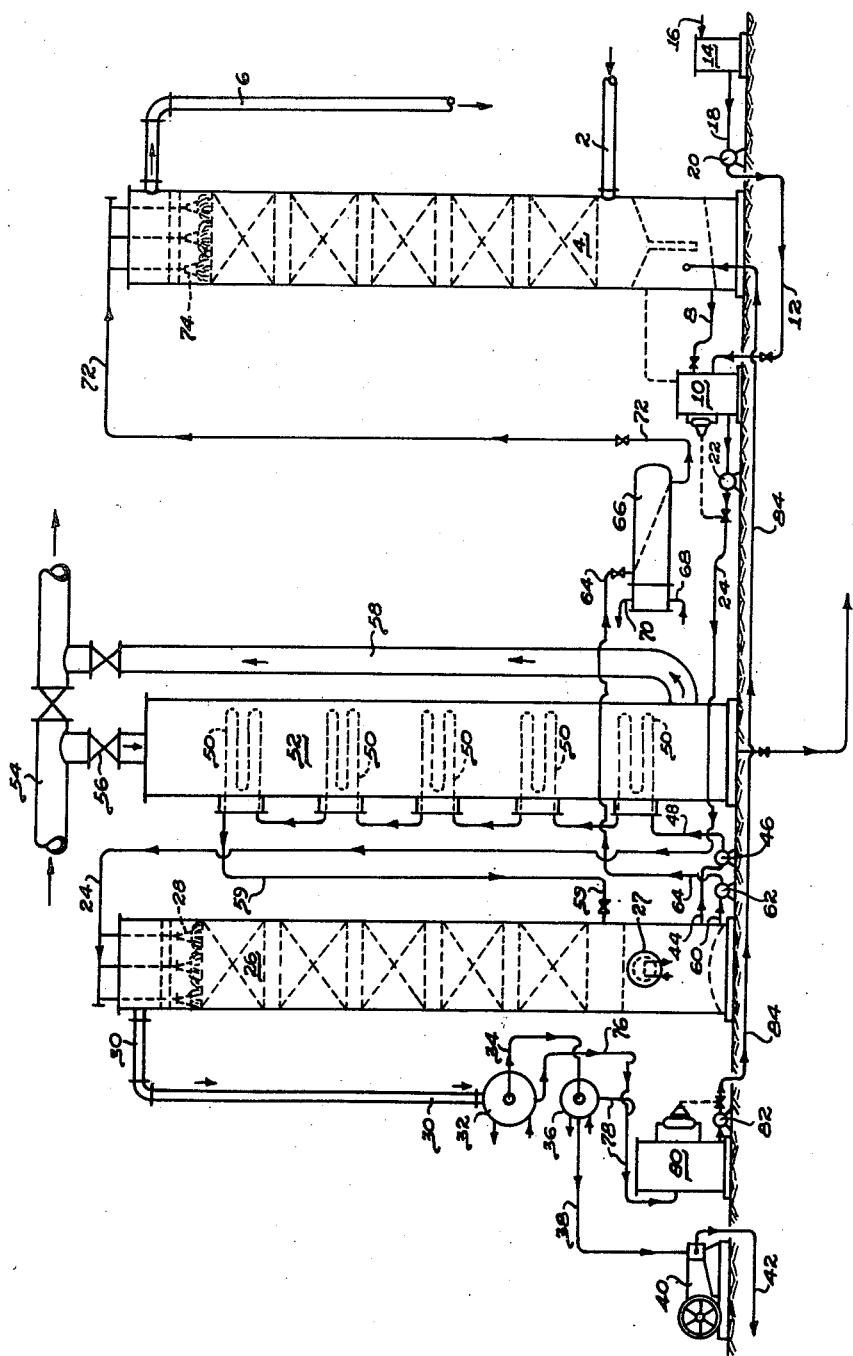
INVENTOR.
HERBERT A. GOLLMAR.
BY Edmund F. Borley
his ATTORNEY.

Patented June 26, 1945

2,379,076

UNITED STATES PATENT OFFICE 2,379,076

GAS PURIFICATION PROCESS

Herbert A. Gollmar, Mount Lebanon, Pa., assignor, by mesne assignments, to Koppers Company, Incorporated, Pittsburgh, Pa., a corporation of Delaware Application July 18, 1944, Serial No. 545,468

9 Claims. (Cl. 23—181)

The present invention relates to the liquid purification of by-product coke-oven gas in respect of the separation and recovery of hydrogen sulphide therefrom. More particularly the invention relates to a process for the separation and recovery of hydrogen sulphide by scrubbing coke-oven gas with aqueous absorbent and actifying the absorbent by heating it under subatmospheric pressure. The process purifies the gas to a high degree and also provides a technical grade of hydrogen sulphide which, for example, can be used for manufacture of sulphuric acid.

The primary object of the invention is to provide a process for separation and recovery of hydrogen sulphide from coke-oven gas without being contaminated with air whereby economy of operation is obtained.

Another object of the invention is to provide a process which is more closely articulated with the by-product system of a coke plant in order that overall advantages of economical operation can be obtained.

Briefly stated, the present invention consists in a process for recovering hydrogen sulphide from coke-oven gas by scrubbing it with an aqueous, alkaline solution; actifying the solution under reduced pressure and liberating hydrogen sulphide dissolved therein by heating the fouled absorbent by direct contact with steam formed by vaporization of absorbent which has been heated by indirect contact with hot coke-oven gas and vaporized by the reduced pressure in the actifier. The heating of the actified solution results in the simultaneous cooling of the coke-oven gas flowing from the collecting mains of an oven-battery similar to the cooling provided by the customary indirect primary cooler.

In the accompanying drawing forming a part of the specification and showing for purposes of exemplification a preferred apparatus in which the invention may be embodied and practiced but without limiting the claimed invention specifically to such illustrative instance or instances, the single figure is a diagrammatic elevational view of apparatus for the continuous separation and recovery of hydrogen sulphide from coke-oven gas with utilization of heat of the by-product system in the hydrogen sulphide recovery.

Referring now to the said figure, coke-oven gas containing hydrogen sulphide flows through a pipe 2 into an absorber 4 containing packing and in which the said gas rises in countercurrent contact with continuously descending absorbent, for example, aqueous solution of sodium carbonate. The said sodium carbonate solution in the absorber 4 absorbs hydrogen sulphide from the countercurrently flowing coke-oven gas. The so-treated coke-oven gas leaves the absorber at the top thereof and flows to additional apparatus of the by-product system through the pipe 6. Fouled absorbent solution flows from the bottom of the absorber 4 through a valved pipe 8 into a pumping tank 10 to which also is delivered through a valved pipe 12 freshly made up absorbent. The said make-up absorbent is prepared in a mixing tank 14 to which is delivered water and, for example, sodium carbonate through a pipe 16 and is mixed in said tank. The fresh absorbent is pumped from the mixing tank 14 through a pipe 18 by pump 20 and through the said pipe 12 to the hereinbefore mentioned pumping tank 10. Fouled absorbent from the pumping tank 10 is delivered by a pump 22 through pipe 24 into the top of an actifier column 26 and distributed through nozzles 28 in a descending flow down over packing in the column. In the actifier 26 the fouled absorbent is brought into direct contact with rising, countercurrently flowing gases and vapors which continuously liberate dissolved hydrogen sulphide from the fouled absorbent, and which thereby actify the downflowing absorbent. Actification of fouled absorbent by countercurrent sweep vapors can be supplemented by heat from a reboiler 27.

The relatively cool fouled absorbent flowing into the top of the actifier 26 also acts as a condensing medium partially to condense steam from the said vapors which pass through the actifying column.

The hydrogen sulphide and remaining steam in admixture therewith are flowed from the top of the actifier 26 through a pipe 30 into a condenser 32 wherein a larger portion of the remaining steam is condensed. Thence the hydrogen sulphide flows through pipe 34 to a second condenser 36, of smaller dimension in which substantially the remainder of the steam is condensed. Substantially dry technical grade hydrogen sulphide is continuously withdrawn from the said condenser 36 through pipe 38 by the vacuum pump 40 by which means the entire actification zone is held under less than atmospheric pressure and by which means also the hydrogen sulphide is pumped through a pipe 42 to any point for utilization thereof.

Actified absorbent solution is pumped from the base of the said actifier 26 through a pipe 44 by a pump 46 and thereafter through a pipe 48 into the heating coils 50 of a gas-to-liquid heat exchanger 52. The solution is forced through the described channels by the said pump 46 from the zone of subatmospheric pressure in the said actifier 26 into a zone of increased pressure in the said coils 50. The heating coils 50 are arranged and operated in series.

Hot coke-oven gas flowing directly from the collecting mains of a by-product oven-battery is delivered through a suction main 54 and valve 56 into the top of the said gas-to-liquid heat exchanger 52 which acts, simultaneously in respect of the coke-oven gas as an indirect primary cooler. The said coke-oven gas is continuously brought into indirect contact with the relatively cool absorbent in countercurrent flow relation in the said heating coils 50. The coke-oven gas descends the column 52 and flows therefrom through valved gas pipe 58 at a lowered temperature and with a correspondingly lowered content of moisture and tarry constituents as will be more fully hereinafter described.

Heated and partially vaporized actified absorbent flows from the heating coils 50 of heat exchanger 52 through a valved pipe 59 and is thus returned in the described closed cycle into the base of the said actifier 26. Upon delivery into the actifier 26, which is maintained under a partial vacuum, the heated absorbent vaporizes and ascends the said column through packing provided therein and in countercurrent, direct contact with descending fouled absorbent.

Another portion of actified absorbent is withdrawn from the bottom of the said actifier 26 through the pipe 60 and is pumped by pump 62 through a pipe 64 to a cooler 66 that is conventionally supplied with inlet and outlet cooling-water pipes 68 and 70, respectively. Cooled, actified absorbent is flowed from the said cooler 66 through valved pipe 72 to the top of the said absorber 4 into which it is sprayed by nozzles 74 upon the packing provided therein.

Condensed steam is flowed from the said condensers 32 and 36 through pipes 76 and 78 respectively into a pumping tank 80. Collected condensate is withdrawn by a pump 82 from the said tank 80 through a pipe 84 and is pumped into the bottom of the absorber 4 at which point the condensate is mixed with fouled absorbent in order that it may simultaneously be actified and treated for removal of any hydrogen sulphide dissolved therein.

In practice according to the present invention, coke-oven gas that is saturated with flushing liquor by which the said gas was sprayed in the collecting mains and which is at a temperature of approximately 80° C., is, as was hereinbefore described, brought into continuous, indirect countercurrent contact with relatively cool absorbent.

In its descending passage through the said heat exchanger 52 the said gas is cooled about ten degrees centigrade or to about 70° C. A larger portion of the heat delivered to the actified absorbent in heat exchanger 52 derives from the heat of condensation of, more especially moisture with which the coke-oven gas is saturated by the spray of flushing liquor in the collecting mains, and tarry materials in the hot coke-oven gas.

The actified absorbent in the heat exchanger 52 is raised in temperature approximately 10° C. and usually from about 50° C. to about 60° C. The latter temperature has been found to be an optimum one for the actification of fouled absorbent under less than atmospheric pressure. At this temperature so-heated absorbent vaporizes as soon as it enters the evacuated zone within the actifier 26 and may be partially vaporized within the uppermost of the cooling coils 50. As a rule however the back pressure of vapors in the said pipe will maintain the absorbent in liquid phase in the said cooling coils 50.

Although means have been provided, in the described preferred embodiment for by-passing the gas-to-liquid exchanger 52 with any preferred fraction of coke-oven gas, nevertheless the process is ordinarily simply operable with employment of the total gaseous output of coke-oven battery to reactify absorbent solution purifying the total yield of the said gas.

The above-described process in addition to purifying coke-oven gas in respect of its hydrogen sulphide content provides as a product of the method a technical grade hydrogen sulphide that is suitable for the manufacture, for example, of sulphuric acid.

The method as particularly described and as claimed is primarily adaptable to continuous operation. Although the invention as hereinbefore set forth is embodied in particular form and manner it may be variously embodied within the scope of the claims hereinafter made.

I claim:

1. A process for separation and recovery of hydrogen sulphide from coke-oven gas, comprising: scrubbing the coke-oven gas with an aqueous alkaline absorbent and absorbing hydrogen sulphide therefrom; removing fouled absorbent containing the dissolved hydrogen sulphide from the absorption zone and flowing the same through an actification zone under less than atmospheric pressure; and generating vapors by expanding into the actification zone actified liquid which has been preheated by heat exchange with hot coke-oven gases, said vapors passing through the actification zone to liberate hydrogen sulphide from the fouled absorbent.

2. A process for separation and recovery of hydrogen sulphide from coke-oven gas, comprising: absorbing hydrogen sulphide from the coke-oven gas by scrubbing it with an aqueous alkaline absorbent, passing the absorbent with the hydrogen sulphide therein into an actification zone under a subatmospheric pressure, passing actified absorbent from the actification zone into heat exchange contact with hot coke-oven gas to preheat the actified absorbent, expanding the preheated absorbent into the actification zone to generate vapors to liberate gases including hydrogen sulphide from fouled absorbent and removing hydrogen sulphide from the actification zone.

3. A process for separation of hydrogen sulphide from coke-oven gas comprising: passing the coke-oven gas through an aqueous alkaline absorbent to absorb the hydrogen sulphide, passing the absorbent with hydrogen sulphide therein to an actification zone for separation of the hydrogen sulphide, passing the actified absorbent in a closed cycle between the actification zone and a heat exchange zone to preheat actified absorbent under a pressure higher than the pressure of the actification zone with hot coke-oven gas, expanding the actified absorbent in the actification zone to vaporize it, passing the vapors through the actification zone to liberate hydrogen sulphide and gases from fouled absorbent and removing hydrogen sulphide from the actification zone.

4. A process for separation and recovery of hydrogen sulphide from coke-oven gas, comprising: scrubbing the coke-oven gas with an aqueous solution of alkali-metal carbonate to absorb hydrogen sulphide in the gas; removing fouled absorbent containing the dissolved hydrogen sulphide from the absorption zone and flowing the same into an actification zone under less than atmospheric pressure; flowing actified absorbent from the actification zone into indirect contact with hot coke-oven gas directly effluent to the collecting mains of a coke-oven battery to heat absorbent to a temperature at which it vaporizes under the said reduced pressure of the actification zone; returning heated absorbent to the said actification zone and passing the absorbent vapors formed therein into direct contact with fouled absorbent to liberate hydrogen sulphide from the said fouled absorbent; and flowing the so-liberated hydrogen sulphide to storage and returning actified absorbent to the said absorption zone.

5. A process for separation and recovery of hydrogen sulphide from coke-oven gas, comprising: scrubbing the coke-oven gas with an aqueous solution of alkali-metal carbonate to absorb hydrogen sulphide of the gas into the said absorbent solution; removing fouled absorbent, containing the dissolved hydrogen sulphide, from the absorption zone and flowing the same into an actification zone under less than atmospheric pressure; flowing actified absorbent from the actification zone into indirect contact with hot coke-oven gas directly effluent to the collecting mains of a coke-oven battery to effect a primary-cooling of the coke-oven gas and to heat the absorbent to a temperature at which it vaporizes under the said reduced pressure of the actification zone; returning so-heated absorbent to the said actification zone and therein passing vaporized absorbent into countercurrent and direct contact with fouled absorbent to liberate hydrogen sulphide from the said fouled absorbent; condensing sweep vapor from the so-formed mixture of hydrogen-sulphide and condensible sweep vapor and returning the condensate to the actification zone; flowing the said liberated hydrogen sulphide to storage; and returning actified absorbent to the said absorption zone.

6. A continuous, improved process for separation and recovery of hydrogen sulphide from coke-oven gas, comprising: scrubbing the coke-oven gas with an aqueous solution of sodium carbonate to absorb hydrogen sulphide; continuously removing fouled absorbent, containing the dissolved hydrogen sulphide, from the absorption zone and flowing it through an actification zone under less than atmospheric pressure; flowing actified absorbent from the actification zone into indirect contact with hot coke-oven gas directly effluent to the collecting mains of a coke-oven battery to effect a primary-cooling of coke-oven gas of about ten degrees centigrade and a corresponding heating of the absorbent to raise the temperature to at least 60° C.; continuously returning so-heated absorbent to the said actification zone wherein it vaporizes under the said reduced pressure of the said zone and passing the vapors into countercurrent and direct contact with fouled absorbent to liberate hydrogen sulphide from the said fouled absorbent; condensing sweep-vapor from the so-formed mixture of hydrogen-sulphide and condensible sweep vapor and returning the condensate to the actification zone; continuously flowing the said liberated hydrogen sulphide to storage; and returning actified absorbent to the said absorption zone.

7. In a process for the separation and recovery of hydrogen sulphide from coke-oven gas wherein the coke-oven gas is scrubbed with an aqueous, alkaline liquor which absorbs hydrogen sulphide of the gas and which is thereafter reactified by heat and recirculated to the absorption zone, the improvement comprising actification of the said scrubbing liquor by means of heat recovered from hot coke-oven gas by the indirect contact of scrubbing liquor with the said gas after it flows from the collecting mains of a coke-oven battery.

8. In a process for the separation and recovery of hydrogen sulphide from coke-oven gas, in which process coke-oven gas is scrubbed with an aqueous solution of alkali-metal carbonate and hydrogen sulphide is absorbed thereby and dissolved in solution, and in which the fouled absorbent is thereafter actified by heating at less than atmospheric pressure, the improvement comprising the steps of: flowing absorbent from its actification zone into indirect contact with hot coke-oven gas directly effluent to the collecting mains of a coke-oven battery and thereby heating absorbent to a temperature at which it vaporizes under the said reduced pressure of the actification zone; and returning so-heated absorbent to the said actification zone and therein passing vaporized absorbent into direct contact with fouled absorbent thereby to liberate hydrogen sulphide from the said fouled absorbent.

9. In a continuous process for the separation and recovery of hydrogen sulphide from coke-oven gas, in which process coke-oven gas is scrubbed with an aqueous solution of alkali-metal carbonate and hydrogen sulphide is absorbed thereby and dissolved in the solution, and in which the fouled absorbent is thereafter actified by heating at less than atmospheric pressure, the improvement comprising: continuously flowing actified absorbent into indirect contact with hot coke-oven gas flowing from the collecting mains of a coke-oven battery and raising the temperature of the absorbent to at least 60° C. and effecting a primary-cooling of the said gas of ten degrees centigrade; and continuously returning so-heated absorbent to the said actification zone wherein it vaporizes under the said reduced pressure of the said zone and passing the vapors into countercurrent and direct contact with, and liberating hydrogen sulphide from, fouled absorbent.

HERBERT A. GOLLMAR.